B. W. S. RESSLER & C. H. RESSLER.

Harvesters.

No. 139,817.  Patented June 10, 1873.

UNITED STATES PATENT OFFICE.

BUSHROD W. S. RESSLER AND CARTHON H. RESSLER, OF TIPTON, ASSIGNORS TO THEMSELVES AND RICHARD C. CHEESMAN, OF HAGERSTOWN, INDIANA.

IMPROVEMENT IN HARVESTERS.

Specification forming part of Letters Patent No. 139,817, dated June 10, 1873; application filed February 27, 1873.

*To all whom it may concern:*

Be it known that we, BUSHROD W. S. RESSLER and CARTHON H. RESSLER, both of Tipton, in the county of Tipton and State of Indiana, have invented an Attachment for Mowing and Reaping Machines, of which the following is a specification:

The object of this invention is to protect those using mowers and reapers from injury by the machinery should they fall or be thrown from the machine. To this end it consists in the combination, with the seat, of an automatic lock for stopping the rotation of the driving-wheels of the machine, and, consequently, the operation of the cutting mechanism, whereby, should the driver be thrown from his seat, the master-wheel and all the mechanism will be stopped, and, even though the machine be dragged on, injury to his body from the cutting machinery is prevented.

Figure 1:
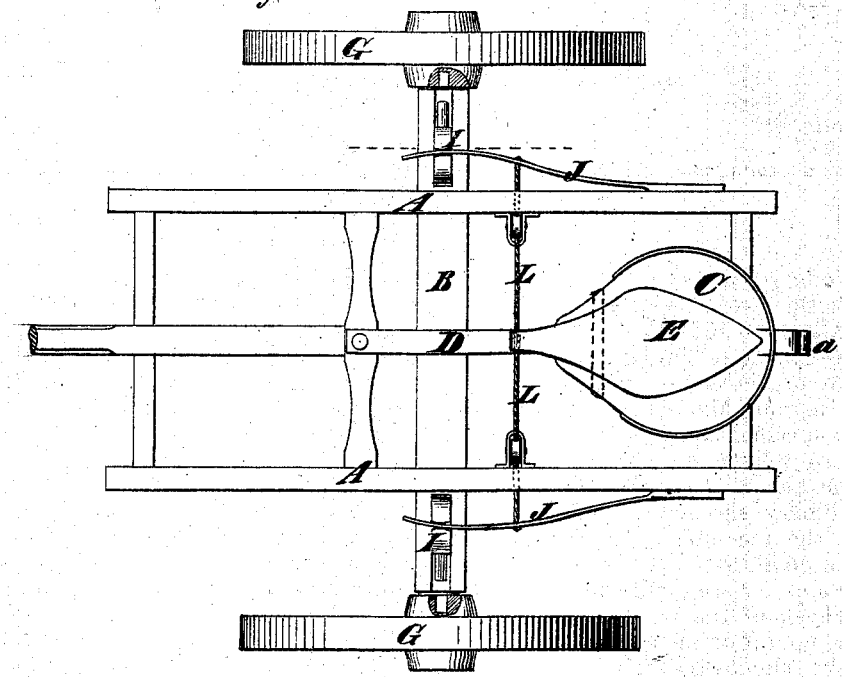
Figure 2:
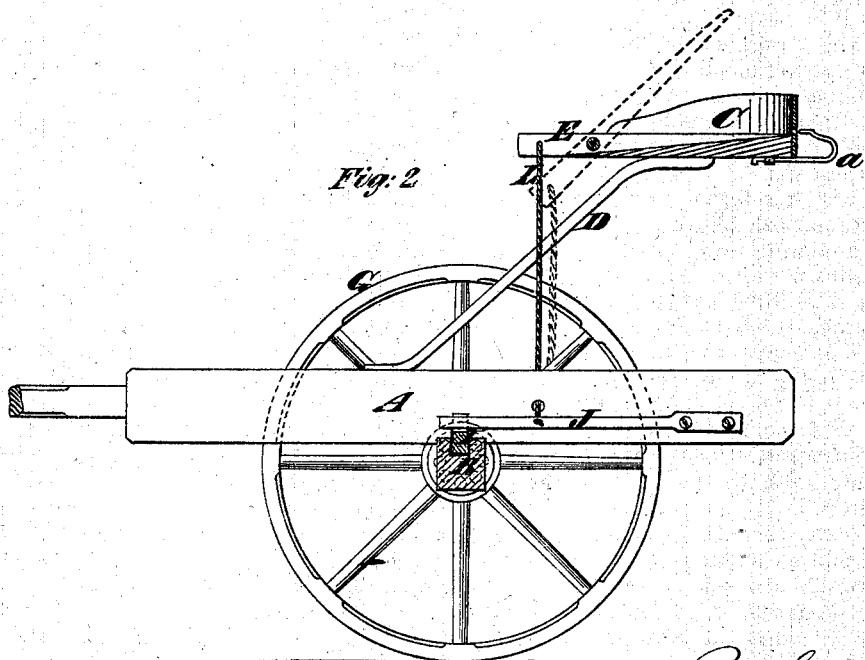

In the accompanying drawing, Figure 1 is a plan of the frame of a machine having my invention applied; and Fig. 2 is a sectional side view of the same.

Similar letters of reference indicate corresponding parts in both figures.

Only the frame and running-wheels of the machine are shown in the drawing, as these are all sufficient to illustrate the invention.

A is the frame, which is or may be of the usual form, and is secured to an axle, B, which is represented as being square, but it is immaterial whether it be so or not. The seat C is of the ordinary shape, and is supported by a single rod or standard, D, in the usual manner. There is countersunk in the seat a piece, E, which is pivoted in place near the forward end, so that it may either fit down in the seat, or be swung up into the position shown in dotted lines in Fig. 2. In rear of the pivot it is so broad as to nearly fill the seat; but in front of the pivot it tapers off to a narrow strip, which projects between the driver's legs when he is on the seat. At the back of the seat is a bolt, *a*, which may be made to project over the end of the piece and retain it in position flush with the seat, when desirable. The running-wheels G G have, in the backs of their hubs, a series of recesses, into which bolts I I on the axle may be shot to lock the wheel therewith. The stocks or bodies of these bolts are dovetailed into the axle opposite the recesses in the hubs of the wheels. In their tops are notches, in which fit flat springs J J, secured at one end to the sides of the frame A. Near their free ends there are attached to the springs cords or chains L, which pass round pulleys in the sides of the frame, and are fastened to the forward end of the seat-piece E.

While the driver remains on the seat his weight on the rear portion of the piece E keeps its forward end raised, and thereby holds the free ends of the springs J close to the frame, and keeps the bolts out of contact with the wheels. Should the driver fall from his seat, or be thrown off by the restiveness of the horses, the instant the piece E is relieved of his weight the springs J J will throw out the bolts into the adjacent recesses in the hubs of the wheels, and will lock the latter rigidly to the axle, and then, even should the horses drag the machine over the ground, the cutting mechanism will be stopped, and he will not be in danger of injury by the knives. Should the driver have to rise from his seat to lift the cutter-bar over a stump or other obstacle, he may lock the piece E in a cumbent position by slipping the bolt *a* over it.

What we claim as our invention, and desire to secure by Letters Patent, is—

The combination of the seat-piece E, the bolts I connected therewith by cords or chains, the notches or recesses in the hubs of the running-wheels G, and the springs J, substantially as and for the purpose specified.

BUSHROD W. S. RESSLER.
CARTHON H. RESSLER.

Witnesses:
NOAH W. PARKER,
WILLIAM J. PFAFF.